US012539977B2

(12) United States Patent
Millet et al.

(10) Patent No.: US 12,539,977 B2
(45) Date of Patent: Feb. 3, 2026

(54) METHOD FOR AUTOMATICALLY CONTROLLING AN AIRCRAFT IN THE EVENT OF A FIRE IN THE ENGINE ZONE AND AN AIRCRAFT

(71) Applicant: AIRBUS HELICOPTERS, Marignane (FR)

(72) Inventors: Arnaud Millet, Pelissanne (FR); Guillaume Dumur, Salon de Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/950,930

(22) Filed: Nov. 18, 2024

(65) Prior Publication Data
US 2025/0276803 A1 Sep. 4, 2025

(30) Foreign Application Priority Data
Feb. 29, 2024 (FR) .................................. 2402011

(51) Int. Cl.
| | | |
|---|---|---|
| B64D 37/32 | (2006.01) | |
| B64D 31/06 | (2006.01) | |
| B64D 45/00 | (2006.01) | |
| F02C 7/25 | (2006.01) | |
| F02C 9/46 | (2006.01) | |

(52) U.S. Cl.
CPC ............ *B64D 37/32* (2013.01); *B64D 31/06* (2013.01); *F02C 7/25* (2013.01); *B64D 2045/009* (2013.01); *F02C 9/46* (2013.01)

(58) Field of Classification Search
CPC ..... B64D 2045/009; B64D 37/32; F02C 7/25; F02C 9/46
See application file for complete search history.

(56) References Cited

U.S. PATENT DOCUMENTS

2010/0004803 A1* 1/2010 Manfredi ............... B64D 25/00
701/14
2019/0126082 A1 5/2019 Wright

FOREIGN PATENT DOCUMENTS

| CN | 109533348 A | 3/2019 | |
|---|---|---|---|
| DE | 102014104302 A1 * | 10/2015 | ............... A62C 3/08 |
| FR | 3130751 A1 | 6/2023 | |

OTHER PUBLICATIONS

English translation of DE102014104302 (Year: 2015).*
(Continued)

*Primary Examiner* — Scott J Walthour
(74) *Attorney, Agent, or Firm* — Brooks Kushman P.C.

(57) ABSTRACT

A method for controlling an aircraft comprising at least two engines, each engine being arranged in its own engine compartment, each engine being connected to a fuel supply circuit provided with its own fuel supply cut-off for cutting off a fuel supply, the aircraft comprising at least one fire detector in each engine compartment, the aircraft comprising at least one first extinguisher and one second extinguisher. An automatic assistance phase comprises, in the event of fire being detected in an engine compartment, automatically and with an avionics system, activating the fuel supply cut-off of the engine present in the compartment concerned, then triggering the first extinguisher, then triggering the second extinguisher in predetermined respective conditions.

16 Claims, 2 Drawing Sheets

(56) References Cited

OTHER PUBLICATIONS

Chapter 17: fire protection systems, Aug. 28, 2016 (Aug. 28, 2016), XP00279132, extract from internet URL : http:/www.sweethaven02.com/aviation/mainthandbook/ama_ch17.pdf [extract on May 15, 2019].
French Search Report for French Application No. FR2402011, Completed by the French Patent Office, Dated Sep. 17, 2024, 9 pages.

* cited by examiner

METHOD FOR AUTOMATICALLY CONTROLLING AN AIRCRAFT IN THE EVENT OF A FIRE IN THE ENGINE ZONE AND AN AIRCRAFT

CROSS REFERENCE TO RELATED APPLICATION

This application claims the priority to French Patent Application No. FR 24 02011 filed on Feb. 29, 2024, the disclosure of which is incorporated in its entirety by reference herein.

TECHNICAL FIELD

The present disclosure relates to a method for automatically controlling an aircraft in the event of a fire in the engine zone and an aircraft applying this method.

BACKGROUND

An aircraft may comprise one or more engines.

For example, a conventional helicopter may comprise several engines that together set a main rotor in motion via a power transmission system. Each engine is also positioned in an engine compartment. Fire detectors are arranged in each engine compartment to detect the possible presence of a fire. Such an aircraft may also comprise two extinguishers. Each extinguisher may transfer an anti-fire agent, such as a halon, to each engine compartment. The aircraft also comprises one fuel shut-off valve per engine for cutting off the fuel supply to the associated engine.

In the event of a fire, the pilot must interpret the alarm generated by a fire detector, identify the engine concerned by the alarm, close the fuel shut-off valve in order not to supply fuel to the fire, trigger an extinguisher and check that the alarm stops. This procedure is complicated because the pilot needs to interpret the situation depending on the alarm that is generated. This procedure entails a heavy workload at a particularly anxious time. The stress the pilot is under may lead to an incident due to a misinterpretation of the situation. In extreme cases, a pilot may even ignore the alarm triggered by a fire detector or seek to perform an emergency landing, forgetting to extinguish the fire.

On some aircraft, engine shutdown may be assisted. On some aircraft, a single button may be used to trigger the two extinguishers.

Documents CN 109 533 348 A, US 2019/126082 A1, FR 3 130 751 A1, and "chapter 17: fire protection systems", Aug. 28, 2016 (2016-08-28), XP002791327, retrieved from the Internet: URL: http:/www.sweethaven02.com/aviation/mainthandbook/ama_ch17.pdf are also known.

SUMMARY

An object of the present disclosure is thus to propose a method for reducing the workload of a pilot in order to reduce the risks of human error in the event of a fire being detected in an engine compartment of an aircraft.

The disclosure therefore relates to a method for controlling an aircraft comprising at least two engines, each engine being arranged in its own engine compartment, each engine being connected to a fuel supply circuit provided with its own fuel supply cut-off for cutting off a fuel supply, said aircraft comprising at least one fire detector in each engine compartment, said aircraft comprising at least one first extinguisher and one second extinguisher.

The control method comprises:
detecting, with at least one of the fire detectors, a fire in a compartment that is on fire among the engine compartments; and
following detecting a fire in the compartment that is on fire, the method comprises an automatic assistance phase controlled by an avionics system, the automatic assistance phase comprising successively, automatically and with the avionics system, activating the fuel supply cut-off of the engine present in the compartment that is on fire so as to no longer supply fuel to this engine, then triggering the first extinguisher, then triggering the second extinguisher in predetermined respective conditions.

Each engine compartment may be delimited by at least one firewall for preventing the detected fire from spreading to another zone of the aircraft.

For example, the engines are connected to a mechanical system. This mechanical system may possibly comprise a rotary wing, a propeller or indeed a yaw motion control rotor of the aircraft. For example, the aircraft is a rotorcraft, in particular a helicopter.

Therefore, if a fire is detected, the avionics system is configured to control the fuel supply cut-off when a first predetermined condition is met. This measure prevents the anti-fire agents emitted by the extinguishers from being sucked into the engine in the compartment that is on fire, optimizing the chances of extinguishing the fire. The avionics system is configured to then trigger the first extinguisher when a second predetermined condition is met, then the second extinguisher when a third predetermined condition is met.

The avionics system therefore helps to considerably reduce the workload of the pilot because, in the event of fire being detected, this avionics system takes various measures, automatically, to extinguish the detected fire. The pilot can therefore focus on other tasks, like searching for a landing area, for example. The avionics system also ensures that the fire extinguishing system of the aircraft is activated in the event of a fire being detected in a compartment that is on fire, which is not the case with a manual procedure that is subject to human error.

Furthermore, this method goes against the concerns of pilots, who want to be able to control a fire extinguishing system in order to prevent from extinguishers being triggered unnecessarily. However, as the aircraft is a multi-engine aircraft, even if one engine is unnecessarily switched off because of a fire being detected incorrectly, the aircraft still always comprises at least one engine in operation to ensure that the flight is completed safely.

Moreover, each fire detector may in particular comprise a thermocouple, thermistor or gas fire detector.

For example, a thermocouple fire detector may comprise two different metal blades that become deformed under the effect of an increase in temperature and move away from each other, opening an electric circuit when a detection threshold is reached. These two blades may comprise one blade that is deformed quickly and one blade that is deformed slowly.

A thermistor fire detector may comprise a temperature sensor based on the variation in an electrical resistance as a function of the temperature.

A gas fire detector may comprise a tube, for example made from stainless steel, filled with a gas-absorbing material. The increase in temperature that results, in particular, from fire, causes the gas in the sealed tube to be expelled, resulting in a rapid and detectable increase in pressure in the tube.

Such a fire detector is highly reliable. Arranging such fire detectors in a multi-engine aircraft that has an avionics system applying the method of the disclosure makes it possible to obtain a robust and reliable anti-fire method.

The method may also comprise one or more of the following features.

According to a first alternative, the aircraft being able to comprise at least one flight control member influencing the movement of the aircraft in the air, following detecting a fire in the compartment that is on fire, the automatic assistance phase comprises regulating a position of said at least one flight control member with the avionics system in order to place said aircraft in a predetermined flight configuration, activating the fuel supply cut-off being triggered at the same time as or after said regulation.

The avionics system is configured to then automatically place the aircraft in a particular flight configuration, compatible with the use of a single engine, for example. Therefore, the avionics system plays an active role in ensuring flight safety.

In this case, the first condition authorizing the activation of the fuel supply cut-off may include the detection of a fire and the meeting of the predetermined flight condition.

Said predetermined flight configuration may possibly be defined by at least one of the following parameters: a forward speed of the aircraft, an operating parameter of an engine different from the engine present in the compartment that is on fire, an altitude or a height of the aircraft. The operating parameter may be a driving power or an engine torque produced by a member of an engine that is not concerned by the detected fire, or by a member set in motion by this engine.

Regulating a position of said at least one flight control member with the avionics system may possibly comprise slaving at least a value of one of the following parameters to a predetermined respective setpoint value: a forward speed of the aircraft, a value of an operating parameter of an engine different from the engine present in the compartment that is on fire, an altitude or a height of the aircraft.

According to a second alternative, activating the fuel supply cut-off is triggered following detecting of a fire.

In this case, the supply of fuel to the engine present in the compartment that is on fire is cut off without any condition other than a fire being detected by a fire detector, or following a predetermined waiting period that gives a pilot the option of cancelling the automatic assistance phase by operating a human-machine shutdown interface. In this case, the first condition authorizing the activation of the fuel supply cut-off may include only the detection of a fire, and also, possibly, the expiry the predetermined waiting period. This predetermined waiting period may, for example, give a pilot the option of cancelling the automatic assistance phase.

According to one possibility compatible with the preceding possibilities, the automatic assistance phase may comprise measuring, with the avionics system, a speed of a movable member of the engine arranged in the compartment that is on fire, and triggering the first extinguisher, controlled by the avionics system, following activating the fuel supply cut-off when said speed of the movable member becomes less than or equal to a predetermined speed threshold.

For example, the engines are turboshaft engines. Therefore, the avionics system may comprise sensing devices measuring the speeds of rotation of the rotating assemblies of the gas generators of the turboshaft engines.

This feature helps maximize the chances of extinguishing the fire by reducing the risk of the anti-fire agent emitted by the extinguishers being sucked into the engine in question.

In this case, the second condition authorizing the triggering of the first extinguisher involves two factors: detecting when the fuel supply cut-off is activated, and detecting when the speed of the movable member of the engine present in the compartment that is on fire becomes less than or equal to a predetermined speed threshold.

Alternatively, the second condition authorizing the triggering of the first extinguisher may comprise only detecting when the fuel supply cut-off is activated, and possibly the expiry of a predetermined period starting from this activation.

According to one possibility compatible with the preceding possibilities, triggering the second extinguisher may be controlled by the avionics system if a fire detector still detects a fire after a predetermined monitoring period following triggering the first extinguisher.

For example, such a period is in the region of 5 seconds. The avionics system is configured to consider that, if a fire is still detected in the compartment that is on fire at the end of this monitoring period, the second extinguisher should be triggered to extinguish this fire.

The third condition authorizing the triggering of the second extinguisher may then be detecting, at the end of the monitoring period following the triggering of the first extinguisher, of a fire in the compartment that is on fire.

According to one possibility compatible with the preceding possibilities, the automatic assistance phase may comprise the following steps:
- when, at the end of a first predetermined period after triggering the first extinguisher, no fire detector detects a fire, the method comprises issuing a first alarm, the first alarm signaling at least the end of the automatic assistance phase or an order to land as soon as possible;
- when, at the end of the first predetermined period after triggering the first extinguisher, a fire detector detects a fire in the compartment that is on fire, the method comprises triggering the second extinguisher at the command of the avionics system;
- when, at the end of a second predetermined period after triggering the second extinguisher, no fire detector detects a fire, the method comprises issuing the first alarm; and
- when, at the end of the second predetermined period after triggering the second extinguisher, a fire detector detects a fire in the compartment that is on fire, the method comprises issuing a second alarm signaling an order to land immediately.

Depending on the seriousness of the current situation, an order to land immediately or as soon as possible may be issued by the avionics system, this order being intended for the pilot.

The order to land immediately is therefore issued if the two extinguishers have not succeeded in extinguishing the fire.

According to one possibility compatible with the preceding possibilities, following detecting a fire, the automatic assistance phase comprises generating, controlled by the avionics system and with an alerter, of a fire alert indicating the engine compartment concerned.

A pilot is thus informed that a fire has been detected and can act accordingly.

According to one possibility compatible with the preceding possibilities, following detecting a fire, the automatic assistance phase comprises generating, controlled by the avionics system and with an alerter, of an information alert following the launching of the automatic assistance phase.

A pilot is thus informed that the automatic assistance phase is under way. This step allows the pilot to focus on other tasks.

According to one possibility compatible with the preceding possibilities, following activating the fuel supply cut-off, the automatic assistance phase comprises generating, controlled by the avionics system and with an alerter, a status alert following said activation of the fuel supply cut-off.

A pilot is thus informed of the progress of the automatic assistance phase, and in particular of the cutting off of the supply of fuel to the engine concerned. This cut-off may be detected by the avionics system by means of a signal issued by a position sensing device measuring the position of a shutter of the fuel shut-off valve, or, for example, by a flowmeter measuring the flow rate of fuel transmitted to the engine.

The term "signal" refers hereinafter to an analog, digital, electrical or optical signal, for example.

According to one possibility compatible with the preceding possibilities, following triggering the first extinguisher, the automatic assistance phase comprises generating, controlled by the avionics system and with an alerter, a first extinguishing alert following this triggering of the first extinguisher.

When an extinguisher ejects the anti-fire agent into an engine compartment, the pressure in the vessel containing this agent drops. For example, each extinguisher may comprise a pressure sensor that transmits a signal when the pressure in the vessel of an extinguisher reaches a low threshold. The avionics system deduces from this that the extinguisher has functioned correctly and transmits a signal to the alerter.

A pilot is thus informed that the automatic assistance phase is under way and has caused the first extinguisher to be triggered.

According to one possibility compatible with the preceding possibilities, following triggering the second extinguisher, the automatic assistance phase may comprise generating, controlled by the avionics system and with an alerter, a second extinguishing alert carrying this triggering of the second extinguisher.

A pilot is thus informed that the automatic assistance phase is under way and has caused the second extinguisher to be triggered.

According to one possibility compatible with the preceding possibilities, the method may comprise stopping the automatic assistance phase following the operation of a human-machine shutdown interface.

The pilot may at any time activate the human-machine shutdown interface if he or she deems it necessary in light of the various information received.

According to one possibility compatible with the preceding possibilities, the automatic assistance phase is activated only during flight by the avionics system. For example, the avionics system applies the automatic assistance phase when the height or altitude of the aircraft is greater than a threshold. To this end, the aircraft may comprise a conventional height or altitude-sensing device.

The disclosure also relates to a computer program comprising instructions that, when said program is run by the avionics system, cause said avionics system to implement the abovementioned method.

The disclosure also relates to an aircraft comprising at least two engines, each engine being arranged in its own engine compartment, each engine being connected to a fuel supply circuit provided with its own fuel supply cut-off for cutting off a fuel supply, said aircraft comprising at least one fire detector in each engine compartment, said aircraft comprising at least one first extinguisher and one second extinguisher.

This aircraft comprises an avionics system in communication with each fire detector, each fuel supply cut-off, and said at least one first extinguisher and one second extinguisher, in order to implement the abovementioned method.

The aircraft may possibly comprise at least one of the following features: each fuel supply cut-off is a fuel shut-off valve, each of said at least one first extinguisher and one second extinguisher comprises an anti-fire agent and one pipe for each engine compartment for conveying said anti-fire agent into each engine compartment.

Each fire detector may possibly comprise a thermocouple, thermistor or gas fire detector.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
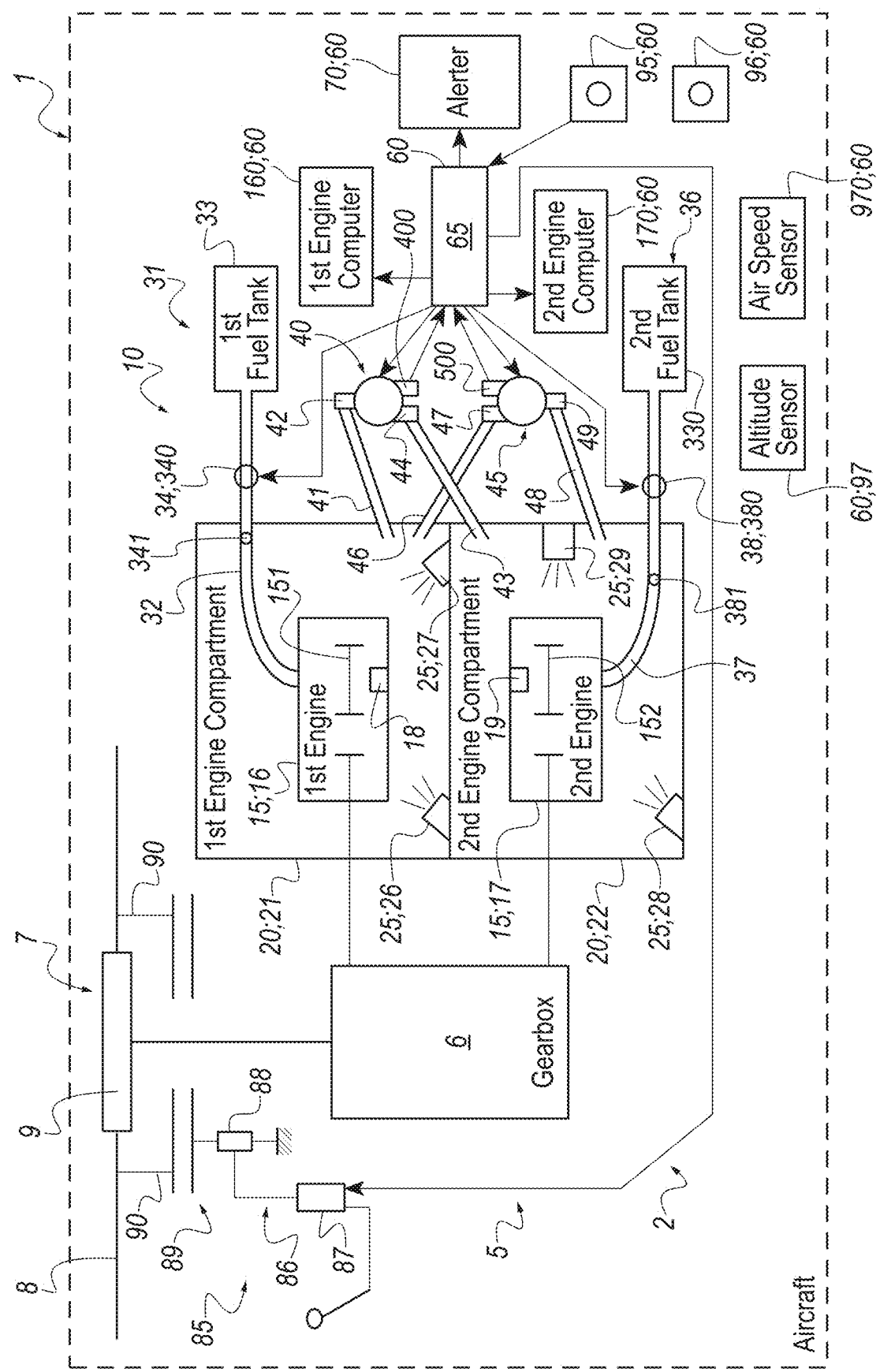
FIG. 1 is a schematic view of an aircraft according to the disclosure.

FIG. 1 shows an aircraft 1 capable of implementing the method of the disclosure described hereinafter.

This aircraft 1 comprises at least two engines 16, 17. Reference number 15 is used to denote any engine, if required. The engines 15 may be connected to a mechanical system 2. For example, this mechanical system 2 comprises a power transmission system 5 that sets a rotating system 7 in motion. According to the example shown, the power transmission system 5 comprises a gearbox 6 connected by conventional members, which are not shown here in order not to clutter the Figure, to each engine 15 and to the rotating system 7. This rotating system 7 may comprise at least one blade 8, possibly carried by a hub 9. Such a rotating system 7 may form a propeller, a rotary wing or a yaw motion control rotor, to give various examples.

Irrespective of this aspect, each engine 15 may be an engine supplied with fuel. Each engine 16,17 is then connected to a fuel supply circuit 31, 36. Each fuel supply circuit 31, 36 comprises at least one tank 33, 330, possibly shared with the other fuel circuit, at least one duct 32, 37 linking the tank to the associated engine, and at least one fuel supply cut-off 34, 38 specific to the associated engine 15. Therefore, the first engine 16 is supplied with fuel by a first fuel supply circuit 31, this first fuel supply circuit 31 comprising a first duct 32 equipped with at least one first fuel supply cut-off 34 and extending from a tank 33 to the first engine 16. Similarly, the second engine 17 is supplied with fuel by a second fuel supply circuit 36, the second fuel supply circuit 36 comprising a second duct 37 equipped with at least one second fuel supply cut-off 38 and extending from a tank 330 to the second engine 17.

Each fuel supply cut-off 34, 38 may comprise a fuel shut-off valve, and/or a pump. Activating the fuel supply cut-off therefore involves closing the fuel shut-off valve or stopping the pump, depending on the variant.

Moreover, each engine 16,17 comprises a movable member 151, 152. In the context of a turboshaft engine, this movable member 151, 152 may be the rotating assembly of the gas generator, and may comprise at least one compression stage constrained to rotate with at least one turbine.

Moreover, each engine 16, 17 is arranged in its own engine compartment 21, 22. Reference number 20 denotes any engine compartment, if required. Each engine compartment 21,22 may be delimited by at least one firewall for containing a possible fire in this engine compartment 21,22.

Furthermore, at least one fire detector 26-29 is housed in each engine compartment 21, 22. Reference number 25 may denote any fire detector, if required. For example, a given engine compartment 21, 22 may comprise fire detectors 26-27, 28-29 set at different triggering temperatures depending on their positioning. Each fire detector 26-29 may comprise a thermocouple, thermistor or gas fire detector.

Moreover, the aircraft 1 comprises at least one first extinguisher 40 and one second extinguisher 45. Each extinguisher 40, 45 comprises a vessel housing an anti-fire agent, such as a halon. Furthermore, each extinguisher 40, 45 may comprise one pipe for each engine compartment 21,22, i.e., a first pipe 41, 46 leading into the first engine compartment 21 and a second pipe 43, 48 leading into the second engine compartment 22 according to the example shown. Each extinguisher 40,45 comprises one trigger 42, 44, 47, 49 per pipe 41, 43, 46, 48 of this extinguisher 40,45, such as pyrotechnic cartridges, for example, for conveying the anti-fire agent to one or another of the pipes 41, 43, 46,48.

Alternatively, each engine compartment may have its own extinguishers, for example.

Furthermore, each extinguisher 40, 45 may comprise a pressure sensor 400, 500 that transmits a particular signal when the pressure inside its vessel reaches a low threshold that signifies the injection of the anti-fire agent into an engine compartment.

Moreover, the aircraft 1 comprises an avionics system 60 in communication with each fire detector 26-29, each fuel supply cut-off 34, 38, and each extinguisher 40, 45 in order to implement the method of the disclosure.

For example, this avionics system 60 may comprise one speed sensing device 18, 19 per engine 16,17 measuring the speed of the movable member 151, 152 of this engine 16, 17, i.e., a first speed sensing device 18 for the first engine 16 and a second speed sensing device 19 for the second engine 17.

The avionics system 60 may comprise a controller in communication with the speed sensing devices 18, 19. The controller may run a computer program comprising instructions that, when the program is run by the avionics system 60, causes the avionics system 60 to implement the method of the disclosure.

This controller may comprise one engine computer per engine 15, i.e., a first engine computer 160 controlling the first engine 16 and a second engine computer 170 controlling the second engine 17, according to the example shown.

This controller may comprise an automatic flight control computer 65, possibly in communication with the engine computers 160, 170.

By way of example, each described computer may comprise at least one processor and at least one memory, at least one integrated circuit, at least one programmable system, or at least one logic circuit, these examples not limiting the scope to be given to the term "computer". The term "processor" may refer equally to a central processing unit or CPU, a graphics processing unit or GPU, a digital signal processor or DSP, a microcontroller, etc.

According to another aspect, the avionics system 60 may be configured to automatically control the aircraft 1 in certain conditions, by controlling a position of one or more flight control members. The controller may, for example, run a program for this purpose.

Such a flight control member may be in the form of a blade 8 according to the example shown, the pitch angle of the blade 8 being capable of being controlled using one or more servocontrols 88. Another flight control member may be in the form of a fuel metering valve supplying fuel to an engine 15, a blade of another rotor, a vertical stabilizer flap or tailplane flap, etc. Irrespective of the nature of the flight control member, the position of the flight control member can be controlled with an actuator of the avionics system 60.

For example, each blade 8 may be hinged to a pitch rod 90 that is hinged to a set of swashplates 89, the position of the set of swashplates 89 being capable of being controlled with servocontrols 88. Each servocontrol 88 may be controlled by a control channel 86 comprising at least one actuator 87. The controller, and possibly the automatic flight control computer 65, may control the actuators 87.

Moreover, the avionics system 60 may comprise a human-machine control interface 95 for requesting the application of the method of the disclosure, and/or a human-machine shutdown interface 96. These interfaces transmits signals to the controller, or to the automatic flight control computer 65, in particular. Each human-machine interface may comprise at least one button, a touch screen, a mouse, a keyboard, a voice system, etc.

Moreover, the aircraft 1 may comprise an alerter 70 capable of generating various alerts at the command of the controller and, for example, of the automatic flight control computer 65. Each alert may be in the form of a visual alarm, for example by displaying one or more characters on a screen, and/or an audible and/or haptic alarm. If there is a visual alarm, the alerter 70 may comprise one or more screens. The controller, or the automatic flight control computer 65, may transmit one or more signals to the alerter in order to request the issuing of the required alerts.

Moreover, the aircraft 1 may comprise a height- or altitude-sensing device 97 measuring a height or an altitude, for example a radio altimeter, or a conventional forward speed sensing device 970 measuring a speed of the aircraft and, for example, an air speed.

The aircraft 1 may possibly comprise a position sensing device 340, 380 in each fuel supply cut-off 34,38 for assessing whether a member of this fuel supply cut-off is in a closed position, or a flow rate sensing device 341, 381 in each fuel supply circuit 31, 36 for determining whether the supply of fuel to an engine 15 is open or closed.

These sensing devices 97, 970, 341, 381 transmit signals to the controller, or to the automatic flight control computer 65, in particular.

Figure 2:
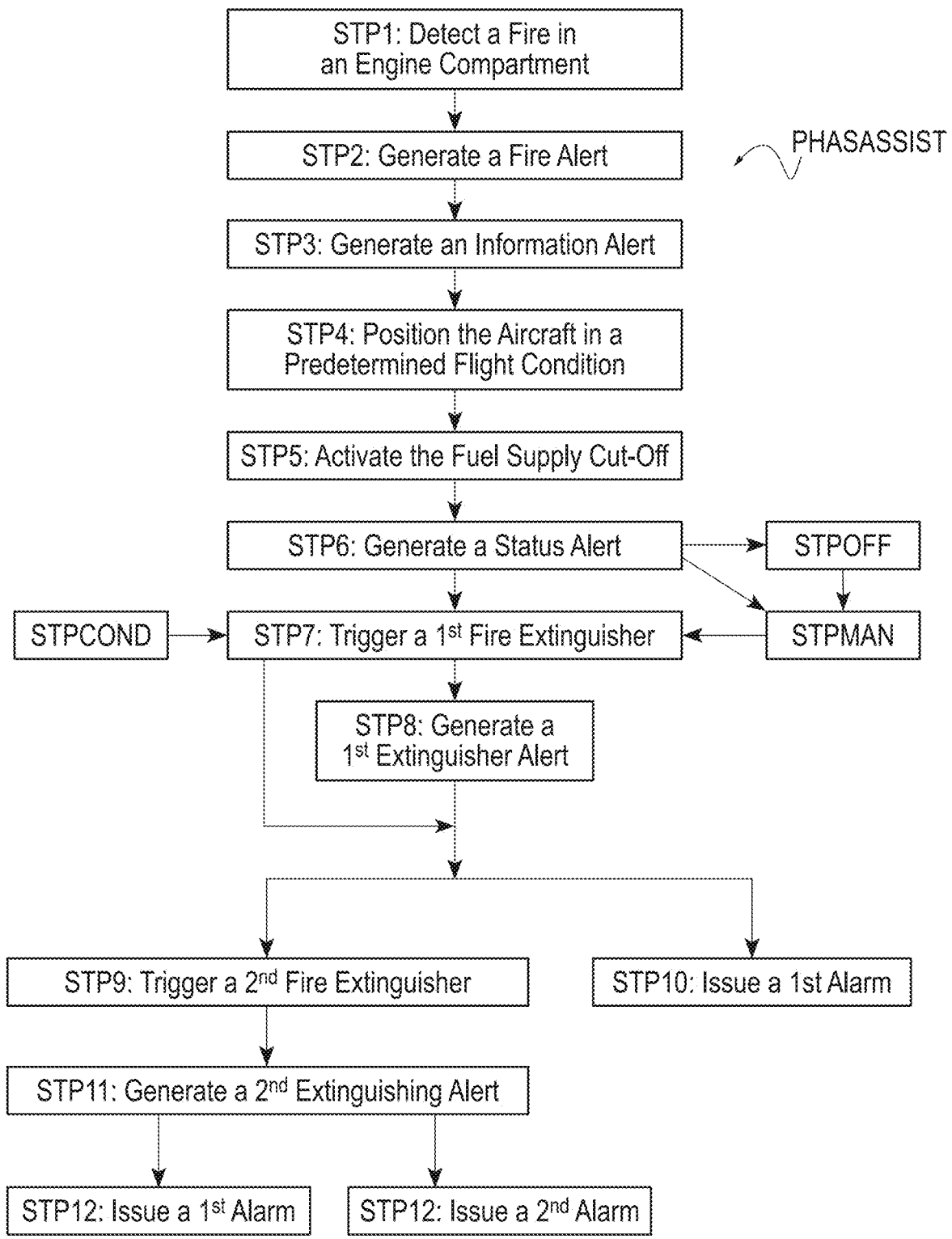
FIG. 2 is a logic diagram showing the method of the disclosure.

FIG. 2 shows a method for controlling such an aircraft 1 in the event of a fire in an engine compartment.

This method may comprise a step of activating the method by operating the human-machine control interface 95.

In the event of a fire, the method comprises detecting, during a step STP1, with at least one of the fire detectors 26-29, a fire in an engine compartment referred to as the "compartment that is on fire". To illustrate the disclosure, the compartment that is on fire will be considered hereinafter to be the first engine compartment 21.

A fire detector, for example the detector 27, then transmits a signal to the controller of the avionics system 60 and, for example, to the automatic flight control computer 65. The controller decodes the signal and deduces therefrom that there is a fire in the compartment that is on fire 21.

Following this detection STP1 of a fire in the compartment that is on fire 21, an automatic assistance phase PHASASSIST is controlled by the avionics system 60. The avionics system 60 possibly activates the automatic assistance phase PHASASSIST only when the aircraft is at a height or an altitude, measured with the sensing device 97, higher than a threshold.

During this automatic assistance phase PHASASSIST, the avionics system 60 controls, successively, automatically and in predetermined conditions, the activation STP5 of the fuel supply cut-off 34 of the engine 16 present in the compartment that is on fire 21, then the triggering STP7 of the first extinguisher 40, then the triggering STP9 of the second extinguisher 45, and possibly the issuing of various alerts.

The method may possibly comprise stopping the automatic assistance phase PHASASSIST at any time after operating the human-machine shutdown interface 96. This human-machine shutdown interface 96 then transmits a signal to the controller that stops the automatic assistance phase. The fuel supply cut-offs 34, 38 and the extinguishers 40, 45 may then be controlled manually with conventional dedicated controls.

According to one possibility, following the detection STP1 of a fire, the method comprises generating STP2 a fire alert signaling the engine compartment concerned. After receiving a fire detection signal from a fire detector, the avionics system 60 controls the alerter 70 to generate a fire alert signaling the detection of a fire and the engine compartment concerned. For example, the controller, or the automatic flight control computer 65, transmits a signal to the alerter 70 to request the generation of the fire alert. This fire alert specifies the engine compartment wherein the fire has been detected. For example, the message "ENG1 FIRE" is displayed to signal a fire in the first engine compartment.

Alternatively, afterwards or at the same time, the automatic assistance phase PHASASSIST may comprise generating STP3 an information alert carrying the launching of the automatic assistance phase PHASASSIST. For example, the controller, or the automatic flight control computer 65, transmits a signal to the alerter 70 to request the generation of the information alert, after receiving a fire detection signal from a fire detector. For example, the message "ENG1 FIRE AUTO PROT" is displayed.

Alternatively, after or at the same time as the preceding alert steps, following the detection STP1 of a fire, the automatic assistance phase PHASASSIST may comprise regulating STP4 a position of at least one flight control member in order to position the aircraft 1 in a predetermined flight configuration, the activation STP5 of the fuel supply cut-off 34, 38 being triggered at the same time as or after said regulation STP4.

For example, after receiving a fire detection signal from a fire detector, the controller, or the automatic flight control computer 65, transmits a signal to at least one actuator acting on a position of a flight control member in order to slave at least a value of one of the following parameters to a predetermined setpoint value: a forward speed of the aircraft 1 measured with the conventional forward speed sensing device 970, a value of an operating parameter of an engine different from the engine present in the compartment that is on fire measured with the speed sensing device 19, an altitude or a height of the aircraft 1 measured with the conventional forward speed sensing device 970.

Irrespective of these possibilities, the activation STP5 of the fuel supply cut-off 34 may be triggered following the detection STP1 of a fire. The controller, or the automatic flight control computer 65, transmits a signal to the fuel supply cut-off 34 that cuts off the supply of fuel to the first engine 16 according to the example shown, for example after receiving a fire detection signal from a fire detector.

Possibly, after activating STP5 the fuel supply cut-off 34, the automatic assistance phase PHASASSIST comprises generating STP6 a status alert. The status alert carries a status signaling that the fuel supply has or has not been cut off. For example, a sensing device for sensing the position of the fuel shut-off valve or a flow rate sensing device transmits a signal to the controller to inform it that the supply of fuel to the engine present in the compartment that is on fire has been cut off. The controller, or the automatic flight control computer 65, then transmits a signal to the alerter 70 to request the generation of the status alert. For example, the message "ENG1 OFF" is displayed, signaling that the fuel shut-off valve is closed.

For example, if a pilot notices that the status alert has not been issued, the pilot can cancel the automatic assistance phase during a stop phase STPOFF, and/or can close off the fuel supply by another means during a step STPMAN and thus resume the automatic assistance phase.

Irrespective of these options, after closing off the supply of fuel to the engine 16 present in the compartment that is on fire 21, the avionics system 60 and, for example, the controller, or the automatic flight control computer 65, transmits a signal to the first extinguisher 40 to trigger STP7 the first extinguisher 40. The trigger 42 is then actuated to inject the anti-fire agent of the first extinguisher 40 into the compartment that is on fire.

The automatic assistance phase PHASASSIST possibly comprises measuring STPCOND, with the avionics system 60, and in particular with the speed sensing device 18 according to the example given, a speed of a movable member 151 of the engine 16 of the compartment that is on fire 21. The avionics system 60 then controls the triggering STP7 of the first extinguisher 40 only when the speed of the movable member 151 becomes less than or equal to a predetermined speed threshold and a fire is detected.

According to one possibility, the automatic assistance phase PHASASSIST comprises generating STP8, with the alerter 70, a first extinguishing alert carrying this triggering of the first extinguisher 40. For example, the pressure sensing device 400 of the first extinguisher 40 transmits a signal to the controller and, for example, to the automatic flight control computer 65, this controller consequently transmitting a signal to the alerter 70 to request the issuing of the first extinguishing alert. For example, the message "ENG1 FIRE SHOT 1" is displayed.

Moreover, c assistance phase PHASASSIST possibly comprises, after the triggering of the first extinguisher 40, generating, with the alerter 70 and at the command of the avionics system 60, a second alarm if at least one fire detector 26-29 detects a fire or a first alarm if no fire detector 26-29 detects a fire. The second alarm signals an order to land immediately, the first alarm signaling at least the end of the automatic assistance phase or an order to land as soon as possible. For example, the first alarm comprises the message "LAND AS SOON AS POSSIBLE", and the second alarm comprises the message "LAND IMMEDIATELY".

For example, the automatic assistance phase PHASASSIST comprises the following steps.

Thus, if, at the end of a first predetermined period after the triggering STP7 of the first extinguisher 40, no fire detector 26-29, in particular that of the compartment that is on fire 21, transmits a signal to the controller to signal a fire, the fire is considered to be extinguished. The method comprises issuing STP10 the first alarm. For example, the controller, or the automatic flight control computer 65, transmits a signal to the alerter 70 to this effect in order to request the issuing of the first alarm. The pilot is then informed that the automatic assistance phase PHASASSIST is complete and, therefore, that the fire has been extinguished and/or that it is advisable to land as soon as possible.

Conversely, if, at the end of a predetermined monitoring period after the triggering of the first extinguisher 40, a fire detector 26-27 detects a fire in the compartment that is on fire 21, the method comprises triggering STP9 the second extinguisher 45. The monitoring period may be equal to or different from the first predetermined period. For example, the controller, or the automatic flight control computer 65, transmits a signal to the second extinguisher 45 to this effect. The trigger 47 is then actuated to inject the anti-fire agent of the second extinguisher 45 into the compartment that is on fire.

The automatic assistance phase PHASASSIST possibly comprises generating STP11, with the alerter 70, a second extinguishing alert carrying this triggering STP9 of the second extinguisher 45. For example, the controller, or the automatic flight control computer 65, transmits a signal to the alerter 70 to this effect. For example, the message "ENG1 FIRE SHOT 2" is displayed.

Thus, if at the end of a second predetermined period after the triggering STP9 of the second extinguisher 45, no fire detector 26-29, in particular that of the compartment that is on fire 21, transmits a signal to the controller to signal a fire, the fire is extinguished. The method comprises issuing STP12 the first alarm.

The triggering STP9 of the second extinguisher 45 is controlled by the avionics system 60 if a fire detector 26-27 still detects a fire at the end of the first predetermined activation period after the triggering of the first extinguisher 40.

Conversely, if, at the end of the second predetermined period after the triggering STP9 of the second extinguisher 45, a fire detector 26-29 detects a fire, the method comprises issuing STP13 the second alarm. For example, the controller, or the automatic flight control computer 65, transmits a signal to the alerter 70 to this effect. The pilot is then informed that the automatic assistance phase PHASASSIST has not allowed the fire to be extinguished and that it is advisable to land immediately.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A method for controlling an aircraft comprising at least two engines, each engine being arranged in a respective engine compartment, each engine being connected to a fuel supply circuit provided with a respective fuel supply cut-off for cutting off a supplied fuel, the aircraft further comprising at least one fire detector in each engine compartment, the aircraft further comprising a first extinguisher and a second extinguisher, wherein the control method comprises:

detecting, with at least one of the fire detectors, a fire in an engine compartment that is on fire among the engine compartments; and following detecting the fire in the engine compartment that is on fire, the method comprises an automatic assistance phase controlled by an avionics system, the automatic assistance phase comprising successively, automatically and with the avionics system:

detecting that a first predetermined condition has been met, the first predetermined condition being at least one of a predetermined flight condition or the expiration of a predetermined waiting period;

activating, in response to detecting that the first predetermined condition has been met, the fuel supply cut-off for the engine in the engine compartment that is on fire to no longer supply fuel to the engine in the engine compartment that is on fire, detecting that a second predetermined condition has been met, the second predetermined condition comprising detecting that the fuel supply cut-off has been activated, triggering, in response to detecting that the second predetermined condition has been met, the first extinguisher to transfer a first anti-fire agent to the engine compartment that is on fire, detecting that a third predetermined condition has been met, the third predetermined condition comprising detecting the continued presence of fire in the engine compartment that is on fire at the end of a predetermined monitoring period following the triggering the first extinguisher, triggering, in response to detecting that the third predetermined condition has been met, the second extinguisher to transfer a second anti-fire agent to the engine compartment that is on fire.

2. The method according to claim 1, wherein the aircraft further comprises at least one flight control member, the method further comprising influencing a movement of the aircraft in the air following detecting the fire in the engine compartment that is on fire, the automatic assistance phase comprising regulating a position of the at least one flight control member with the avionics system to place the aircraft in the predetermined flight configuration, wherein the first predetermined condition comprises the aircraft being in the predetermined flight condition following detecting the fire.

3. The method according to claim 2,
   wherein the predetermined flight configuration is defined by at least one of the following parameters: a forward speed of the aircraft, an operating parameter of an engine different from the engine present in the engine compartment that is on fire, an altitude or a height of the aircraft.

4. The method according to claim 2, wherein regulating the position of the at least one flight control member with the avionics system comprises slaving at least one value of one of the following parameters to a predetermined respective setpoint value: the forward speed of the aircraft, the value of the operating parameter of the engine different from the engine present in the engine compartment that is on fire, the altitude or the height of the aircraft.

5. The method according to claim 1, wherein the first predetermined condition comprises the expiration of the predetermined waiting period following detecting the fire.

6. The method according to claim 1, wherein the automatic assistance phase comprises measuring, with the avionics system, a speed of a movable member of the engine in the engine compartment that is on fire, wherein the second predetermined condition further comprises the speed of the movable member being less than or equal to a predetermined speed threshold following activating the fuel supply cut-off.

7. The method according to claim 1, wherein the automatic assistance phase comprises the following steps:
when, at the end of a second predetermined monitoring period after triggering the second extinguisher, no fire detector detects fire, the method comprises issuing a first alarm, the first alarm signaling the end of the automatic assistance phase or an order to land as soon as possible; and
when, at the end of the second predetermined monitoring period after triggering the second extinguisher, the at least one of the fire detectors detects fire in the engine compartment that is on fire, the method comprises issuing a second alarm signaling an order to land immediately.

8. The method according to claim 1,
wherein, following detecting the fire, the automatic assistance phase comprises generating, controlled by the avionics system and with an alerter, a fire alert indicating the engine compartment that is on fire.

9. The method according to claim 1,
wherein, following detecting the fire, the automatic assistance phase comprises generating, controlled by the avionics system and with an alerter, an information alert.

10. The method according to claim 1,
wherein, following activating the fuel supply cut-off, the automatic assistance phase comprises generating, controlled by the avionics system and with an alerter, a status alert.

11. The method according to claim 1,
wherein, following triggering the first extinguisher, the automatic assistance phase comprises generating, controlled by the avionics system and with an alerter, a first extinguishing alert.

12. The method according to claim 1,
wherein, following triggering the second extinguisher, the automatic assistance phase comprises generating, controlled by the avionics system and with an alerter, a second extinguishing alert.

13. The method according to claim 1,
wherein the method comprises stopping the automatic assistance phase after operating a human-machine shutdown interface following the triggering of the second extinguisher.

14. An aircraft comprising at least two engines, each engine being arranged in a respective engine compartment, each engine being connected to a fuel supply circuit provided with a respective fuel supply cut-off for cutting off a supplied fuel, the aircraft comprising at least one fire detector in each engine compartment, the aircraft comprising a first extinguisher and a second extinguisher,
wherein the aircraft further comprises an avionics system in communication with each fire detector and with each fuel supply cut-off and with the first extinguisher and the second extinguisher, the avionics system comprising a controller configured to:
detect, with at least one of the fire detectors, a fire in an engine compartment that is on fire among the engine compartments; and
perform an automatic assistance phase, following detecting the fire in the engine compartment that is on fire, wherein, in the automatic assistance phase, the controller is configured to:
detect that a first predetermined condition has been met, the first predetermined condition being at least one of a predetermined flight condition or the expiration of a predetermined waiting period;
activate, in response to detecting that the first predetermined condition has been met, the fuel supply cut-off for the engine in the engine compartment that is on fire to no longer supply fuel to the engine in the engine compartment that is on fire,
detect that a second predetermined condition has been met, the second predetermined condition comprising a detected indication that the fuel supply cut-off has been activated,
trigger, in response to detecting that the second predetermined condition has been met, the first extinguisher to transfer a first anti-fire agent to the engine compartment that is on fire,
detect that a third predetermined condition has been met, the third predetermined condition comprising a detected indication of the continued presence of the fire in the engine compartment that is on fire at the end of a predetermined monitoring period following the triggering of the first extinguisher, and
trigger, in response to detecting that the third predetermined condition has been met, the second extinguisher to transfer a second anti-fire agent to the engine compartment that is on fire.

15. The aircraft according to claim 14, wherein the aircraft comprises at least one of:
each fuel supply cut-off is a fuel shut-off valve, or
each of the first extinguisher and the second extinguisher comprises one pipe for each engine compartment for conveying the anti-fire agents into each engine compartment.

16. The aircraft according to claim 15, wherein each fire detector comprises a thermocouple, a thermistor or a gas fire detector.

* * * * *